United States Patent [19]
Mento et al.

[11] Patent Number: 5,483,393
[45] Date of Patent: Jan. 9, 1996

[54] DISK DRIVE HAVING HEAD POSITIONING SERVO WITH IMPROVED SERVO READ SIGNAL PROCESSING USING MEDIAN SERVO BURST PEAK MAGNITUDES

[75] Inventors: Robert P. Mento, El Toro, Calif.;
Jeffrey G. Reh, Longmont, Colo.

[73] Assignee: Western Digital Corporation, Irvine, Calif.

[21] Appl. No.: 229,210

[22] Filed: Apr. 18, 1994

[51] Int. Cl.$^6$ ............................................. G11B 5/596
[52] U.S. Cl. ........................ 360/77.08; 360/77.02
[58] Field of Search ................ 360/77.02, 77.05, 360/77.07, 77.08, 77.11, 78.14, 77.04

[56] References Cited

U.S. PATENT DOCUMENTS

| | | | |
|---|---|---|---|
| 4,424,543 | 1/1984 | Lewis et al. | 360/77.08 X |
| 4,910,617 | 3/1990 | Brunnett et al. | 360/78.14 |
| 5,177,651 | 1/1993 | Moraru et al. | 360/77.08 |

FOREIGN PATENT DOCUMENTS 63-153772  6/1988  Japan .

Primary Examiner—W. R. Young
Assistant Examiner—James L. Habermehl
Attorney, Agent, or Firm—Leo J. Young; James A. Ward

[57] ABSTRACT

A disk drive for use with an embedded head positioning servo system is disclosed. The disk drive includes a disk on the surface of which spaced-apart servo bursts are prerecorded in servo sectors. Successive servo bursts are read by a read/write head which produces oscillating signals having variable magnitude peaks. A timing circuit provides a timing signal, synchronized with the occurrence of the servo sectors, which defines, in time, a servo signal window, during which time a servo burst is being read by the read/write head. A detector circuit measures the magnitudes of each of the peak signals of a servo burst occurring in the servo timing window. The median peak value for a burst is stored, a next burst is detected and measured and the median peak value for that burst is stored. By comparing the median peak magnitudes of successive servo bursts, a servo error signal for use in correcting any error in head position relative to a desired track centerline is produced. The servo error signal is applied to an electrically controlled actuator which moves the read/write head.

15 Claims, 8 Drawing Sheets

$$\text{OFF TRACK INDICATION} = \frac{(\text{Ampl. A}) - (\text{Ampl. B})}{2}$$

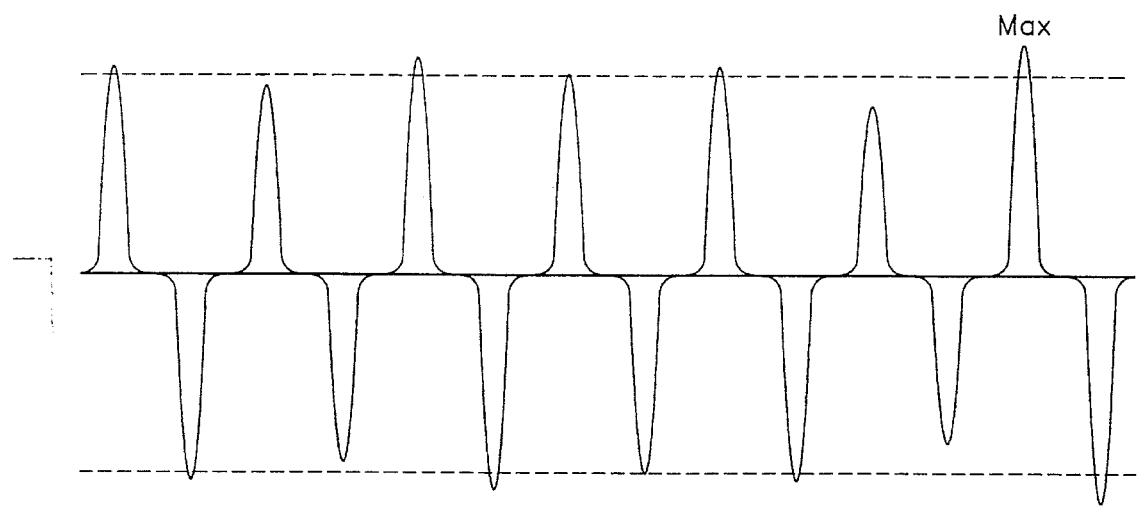
FIG. 4  Peak Magnitude Modulation
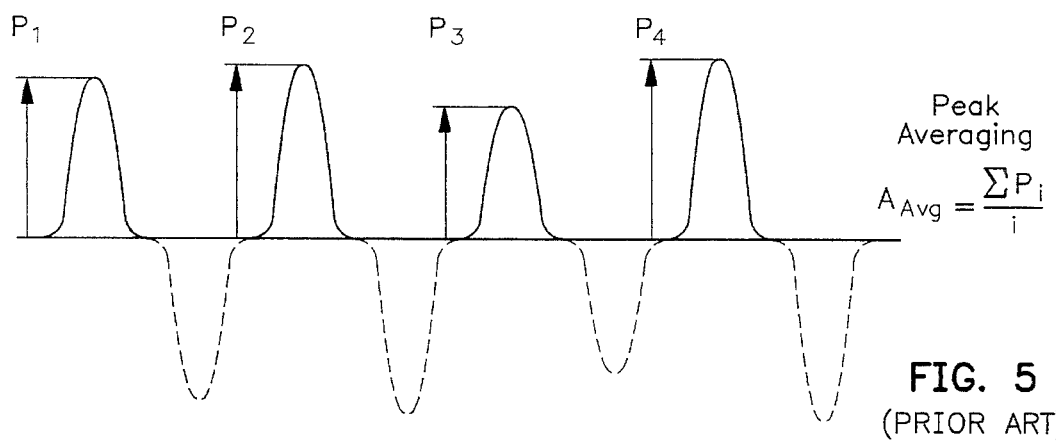
Peak Averaging
$$A_{Avg} = \frac{\sum P_i}{i}$$
FIG. 5 (PRIOR ART)
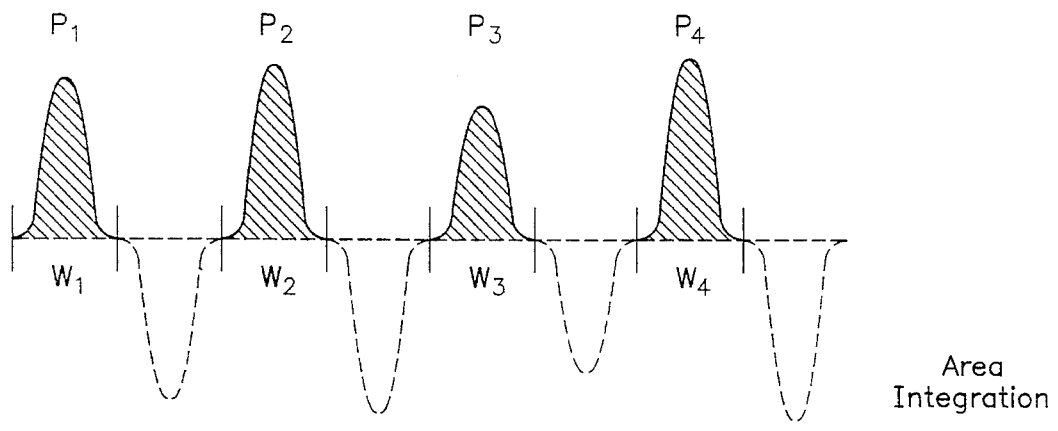
Area Integration
$$A_{Avg} = \frac{\oint P_1 + \oint P_2 + \ldots + \oint P_1}{i}$$
FIG. 6 (PRIOR ART)

5,483,393

1

DISK DRIVE HAVING HEAD POSITIONING SERVO WITH IMPROVED SERVO READ SIGNAL PROCESSING USING MEDIAN SERVO BURST PEAK MAGNITUDES

BACKGROUND OF THE INVENTION

In general, this invention relates to the field of magnetic hard disk drives; more particularly, it relates to such a drive that provides a head positioning servo with improved signal processing circuitry.

DESCRIPTION OF THE PRIOR ART

Extensive research efforts in the field of magnetic hard disk drives for many years have been directed to developing practical techniques for increasing areal recording density. Improved techniques for increasing areal recording density have been an important enabling factor in the trend in this field toward smaller, yet higher capacity, drives.

Areal recording density is generally expressed in terms of bits per square inch or other unit area; analytically, it is the product of the track density (i.e., the number of concentric tracks per inch or "tpi") on the surface of a disk, and the bit density (i.e., the number of bits per inch or "bpi") that can be recorded along a given track. As track density increases thereby reducing the spacing between tracks, it is necessary to provide more precise radial positioning of the active head, i.e., the head being used during read or write operations. Also, as bit density increases, more accurate positioning of the active head over the centerline of the desired track is necessary.

A head positioning servo is intended to ensure that the active head flies precisely over the centerline of the desired track. Maintaining the head in position over the centerline of the desired track during read or write operations is referred to as track "following"; moving it to such desired position is referred to as track accessing or "seeking."

Prior art disk drives have included various known types of head positioning servos. Pertinent such servos include servo burst fields that are recorded during drive manufacture. Servo burst fields comprise a sequence of magnetic flux reversals. During recording of a servo burst field, write current flowing through the head alternates in polarity thereby sequentially inducing the flux reversals. During reading of a servo burst field, the flux reversals cause read current to flow through the head, with such read current defining an oscillating, substantially constant frequency signal referred to herein as the servo read signal. The frequency of a servo read signal is typically in excess of 1 MHz (megahertz).

In a pertinent prior art type of servo, often referred to as an "embedded servo," the prerecorded servo burst fields occupy portions ("servo sectors") of each recording surface, with the servo sectors being angularly spaced and interspersed among the data sectors of the track. Each servo sector is pre-recorded on the recording surface with each having a discrete angular position such that as the recording surface is rotated beneath an active head, servo sectors pass under the active head in time quantifiable phases. Each servo phase represents the angular position of that servo sector on the recording surface and defines a time period for servo processing circuitry in which servo information is valid.

The servo burst fields can have various known types of patterns. One such pattern is referred to as an "A-B" two-burst servo pattern. As schematically shown in FIG. 2,

2 such an "A-B" pattern comprises an outer "A" servo burst field and an inner "B" servo burst field. Such an "A-B" pattern is defined in each servo sector of each data track. Each "A" burst field occupies an arcuate space having a burst-field centerline that is a half-track distance radially to one side of the centerline of an associated track; each "B" burst field occupies an arcuate space having a burst-field centerline that is a half-track distance radially to the opposite side.

During operation of such a servo, the active head flies above and reads servo burst fields during a sequence of time windows to produce the servo read signal, and signal processing circuitry responds to the servo read signal to produce sequential signals that are intended to represent the amplitude of the servo read signal during the successive time windows. Additional circuitry responds to such sequential signals to produce a servo error signal defining a magnitude and direction of an error between actual and desired position. The servo error signal is used to drive a head positioning actuator assembly to move the head radially to fly over the centerline of the desired track.

When the head flies exactly over the track centerline, the sequential reading of the "A" and "B" burst fields should cause the servo to produce a null servo error signal, and would do so under the following idealized circumstances. The "A" burst read signal (i.e., the signal produced by the head during reading of the "A" burst field) would have every one of its peaks have the same magnitude during its timing window. With all such peaks having the same value, the "A" burst read signal define a uniform amplitude during its timing window. Signal processing circuitry would properly demodulate the "A" burst read signal to produce an analog signal referred to herein as the "A" burst demodulated signal, whereby the consistent magnitude peaks of such read signal would cause the "A" burst demodulated signal to have an analog value corresponding to such read signal's uniform amplitude during the same timing window. The "B" burst read signal (i.e., the signal produced by the head during reading of the "B" burst field) would likewise have every one of its peaks have the same magnitude during its timing window. Signal processing circuitry would properly demodulate the "B" burst read signal to produce an analog signal referred to herein as the "B" burst demodulated signal, whereby the consistent magnitude peaks of such read signal would likewise cause the "B" burst demodulated signal to have an analog value corresponding to such read signal's uniform amplitude during the same timing window. Finally, the ideal circumstances involve the two demodulated signals having the same value, such that the difference between them, as represented by the servo error signal, is null With reference to FIG. 3, there will now be described operating conditions when the head is not exactly on the track centerline. The sequential reading of the "A" and "B" burst fields, and the demodulation, and comparison thereof, should cause the servo to produce a servo error signal with appropriate magnitude and direction to use in driving the head positioning actuator assembly to move the head to desired position. For example, if the head is offset towards the "A" side of the track centerline, the analog value of the "A" burst demodulation signal should be higher than that of the "B" burst demodulation signal. Conversely, as illustrated in FIG. 3, if the head is offset towards the "B" side, the analog value of the "A" burst read signal should have a lower amplitude than that of the "B" burst read signal. The further the head is located away from the track centerline, the higher such difference in values will be. The sign of the difference indicates the direction that the head is located relative to the track centerline. By comparing the values of the "A" and "B" demodulated signals, the servo can determine the transducer head position relative to the data track centerline, and the transducer head position may be adjusted by control of the head position actuator assembly.

The accuracy of a head positioning servo depends greatly upon accuracy of the servo error signal. It is a difficult task to produce a servo error signal that accurately represents the direction and extent of the position error.

As part of the process for producing the servo error signal, the servo read signal is demodulated during a defined intervals of time. One prior art approach to demodulating the servo read signal involves using a simple single peak detector. In accord with this approach, the peak having the maximum magnitude (the "maximum peak") during a predetermined time window is selected as representing the amplitude of the burst signal.

However, servo read signal peaks are subject to magnitude modulation caused by non-random noise and random error sources such as media drop-out, transducer head fly-height modulation, particulate induced bumps, and magnetic material non-uniformity among others. Although non-random error tends to be uniform and may be compensated for once its characteristics are determined, random error sources effect peaks individually and are not susceptible to pre-compensation.

With reference to FIG. 4, which shows the waveform diagram for a representative example of a servo read signal, the maximum peak (labelled "MAX") is uncharacteristically high. Selecting a single peak, which may be uncharacteristically high or low, to represent the burst signal's amplitude is a drawback.

A similar drawback exists with another prior art approach which involves determining the average value of the magnitudes of a series of peaks defined during a predetermined time window. In such a peak averaging approach, as indicated in FIG. 5, the servo read signal can be full-wave or half-wave rectified before peak averaging is performed. A third prior art approach involves area integration. In such an area integration approach, as indicated in FIG. 6, the area under each individual peak is determined and either the average of the areas or a normalized sum of all the areas is taken to represent the burst signal's amplitude.

The main drawback of these prior art approaches is that a single peak signal having an uncharacteristically high or low magnitude value will distort the amplitude determination for the servo read signal, resulting in an incorrect determination of head position relative to the centerline of the data track. Non-random error sources such as media coercivity defects (drop-outs), transducer fly-height modulation due to media bumps, electronic shot-noise or intersymbol modulation (ISM) caused by interaction of neighboring flux transitions, may easily cause such uncharacteristic shifts in the peaks. All of the prior art demodulation techniques factor peak values into their respective calculations. One result of the prior art peak averaging or area integration approaches is the requirement that each servo burst contain a sufficient number of cycles to take into account amplitude variations due to non-random error sources, thus minimizing the effects of single-peak amplitude distortion on the burst amplitude calculation. However, increasing the length of a servo burst field to take into account all the variations of the system results in a reduction of the remaining track length and a consequent reduction in the storage capacity of a disk drive.

A further drawback of the area integration approach, in particular, is a requirement for extremely precise window timing in order to locate the outer boundaries of the peak to be integrated. Too narrow a window results in area cut-off of the leading and trailing edges of the waveform, while too wide a window captures significant dead areas between peaks, both resulting in errors in the integrated area calculation. A shift in the window edges, due for example to timing jitter, may result in area cut-off of some peak waveforms while others are fully captured. Minimization of window timing errors usually requires use of costly, high precision components in the integrator circuitry, leading to a higher cost per bit for a disk drive of a given storage capacity.

SUMMARY OF THE INVENTION

The present invention describes improved signal processing circuitry for a head positioning servo of the embedded type in which spaced apart pre-recorded servo bursts move under an active head to cause production of a servo read signal used to provide positional feedback information in a disk drive servo loop.

The servo read signal is an oscillatory, substantially constant frequency, signal. The information content of the input signal resides in its amplitude during sequential predetermined timing windows. The signal processing circuitry includes means for producing a timing signal defining a sequence of timing windows synchronized to the occurrence of a servo burst field under an active head. Detector circuit means responsive to the servo read signal produces a detected signal during each timing window that successively represents individual magnitudes of a plurality of variable-magnitude peaks comprising a servo burst. Signal-storage circuitry, responsive to the detected peak magnitudes, determines and temporarily stores one such magnitude so detected that has the median magnitude.

Signal-processing circuitry in accord with the invention is preferably embodied in an integrated circuit. The integrated circuit receives a servo read signal as an input and successively captures individual peaks comprising a servo burst within a respective timing interval. The integrated circuit further includes means for defining successive timing intervals where each timing interval is synchronized to the occurrence of an individual peak comprising a servo burst. Sample and hold circuit means successively responds to the detected signal to produce a parallel analog signal comprising a corresponding set of held analog magnitude signals, each representing a respective one of the magnitudes successively represented by the detected signal. Encoder circuit means respond to the held magnitude signals to produce a digital word that represents a ranking order of relative magnitudes of the set of held analog magnitude signals. Decoder circuit means decode the digital word to produce a select signal that control selection circuit means for selecting the particular one of the held analog magnitude signals that has the median value.

BRIEF DESCRIPTION OF THE DRAWINGS

FIG. 4 is a waveform diagram of a representative servo read signal which has intra-peak magnitude modulation during a predetermined timing window;

FIG. 5 is a waveform diagram of another representative servo read signal which has such intra-peak magnitude modulation depicting a peak averaging method of signal smoothing;

FIG. 6 is a waveform diagram of magnitude modulated peaks depicting an area integration method of signal smoothing;

DESCRIPTION OF THE PREFERRED EMBODIMENT

Figure 1:
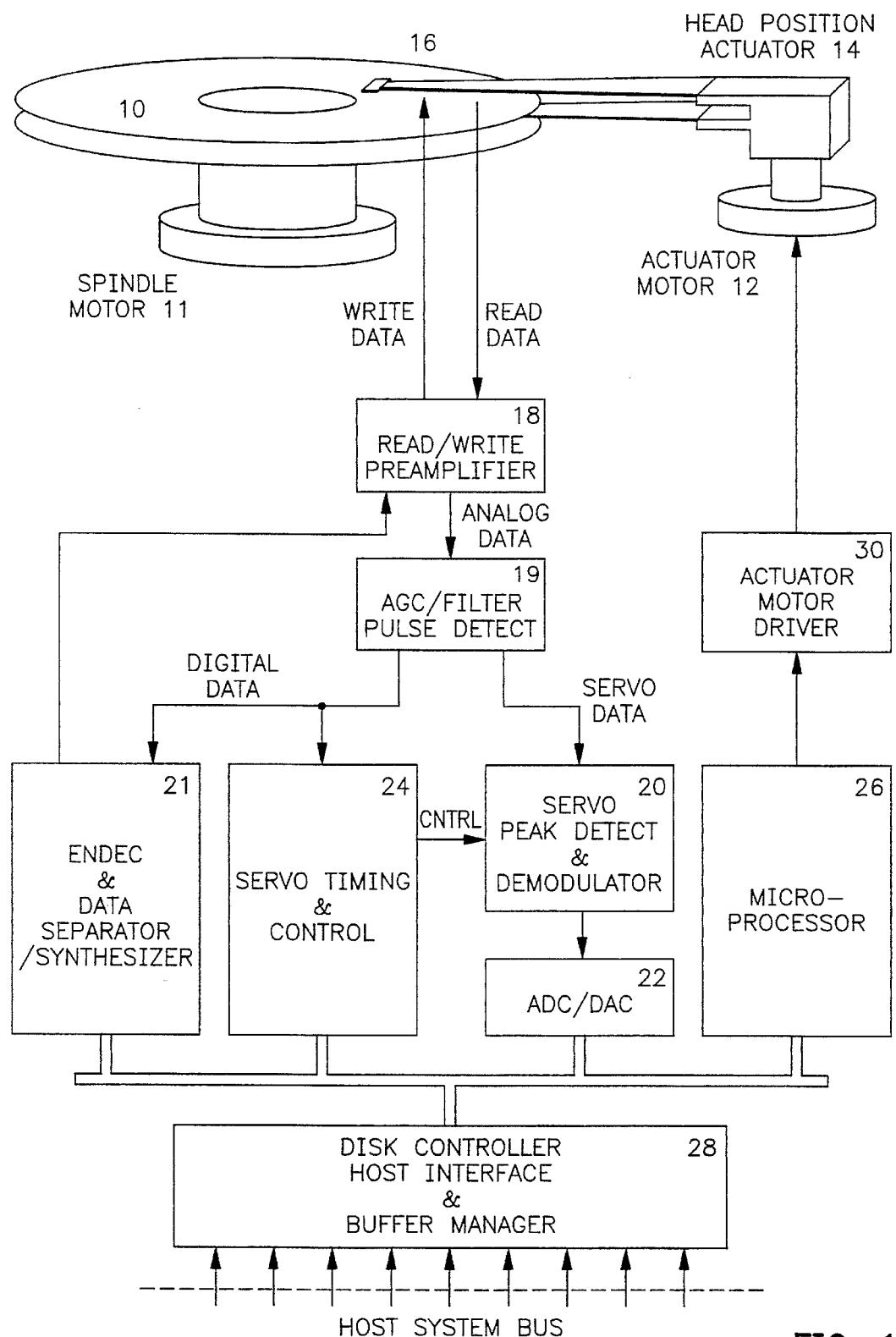
FIG. 1 is a generalized block diagram of a hard disk drive incorporating a head positioning servo in accord with the present invention.
Figure 3:
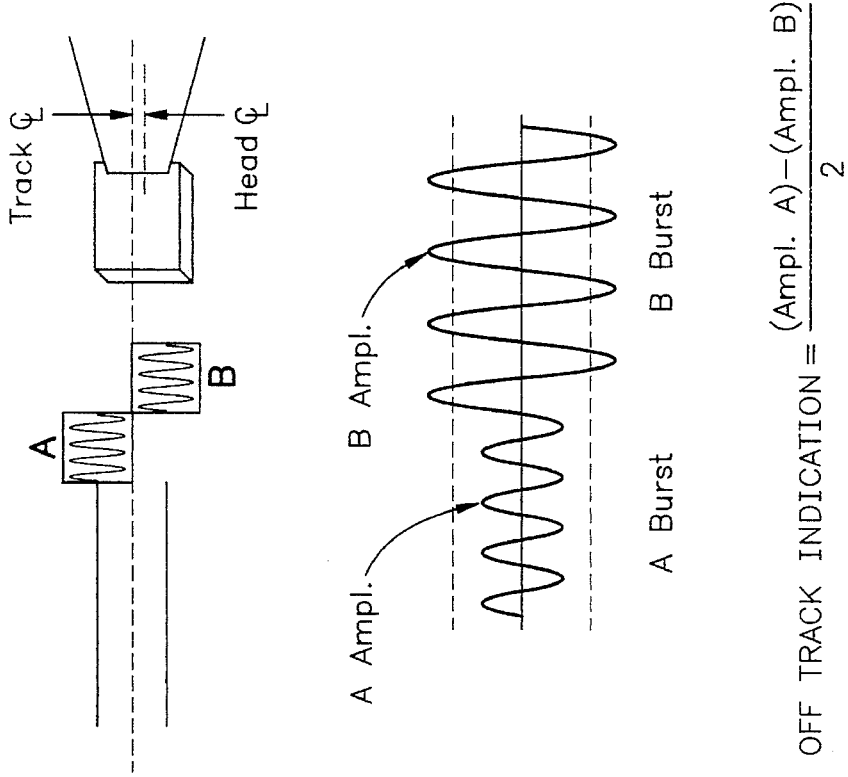
FIG. 3 depicts an "A-B" two-burst servo pattern where the head is displaced slightly off the centerline of a track causing servo inter-burst amplitude modulation.

FIG. 1 is a generalized block diagram depicting a magnetic hard disk drive. The drive includes two rotating disks such as disk 10 mounted on a spindle and rotating about a common axis of revolution. Each disk is coated with magnetic recording media in which is recorded magnetic flux reversals representing information including user data, control data, and servo burst fields. The disk drive further includes a spindle motor 11, connected to the disks through the spindle, which causes the disks to rotate at a substantially constant angular velocity in conventional fashion. The drive further includes an actuator assembly including an actuator motor 12 and a head position actuator 14. Connected to the head position actuator are four read/write transducer heads including head 16 shown flying above the top surface of the top disk. The remaining three heads likewise fly next to a respective one of the three other recording surfaces. The actuator 14 supports the heads, and as driven by the actuator motor, positions the heads to selected radial positions relative to the surfaces of the disks.

Figure 2:
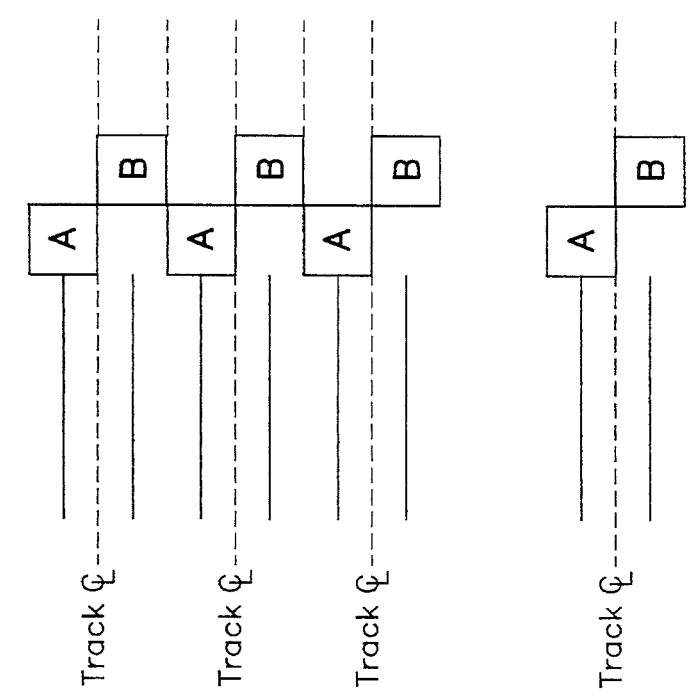
FIG. 2 schematically depicts a portion of an embedded servo sector on the surface of a magnetic disk, and illustrates an "A-B" two-burst servo pattern which is one of the known and suitable ways to place servo burst fields with respect to the track centerlines in an embodiment of this invention.

The drive includes a head positioning servo of the embedded type which includes in each servo sector a suitable servo pattern such as the "A-B" two-burst servo pattern schematically shown in FIG. 2, and servo signal processing circuitry depicted in block diagram form in FIG. 1.

Typical signal processing circuitry used in a hard disk drive includes a read/write preamplifier 18, connected to the read/write transducer heads, for controlling the writing of data to the magnetic media on the disks and the reading of data and servo information from the magnetic media. When reading data, read/write preamplifier 18 receives alternating polarity analog signals induced in the read/write transducer head (Read Data) by means of the head passing over magnetic flux reversals recorded on the rotating magnetic disk, amplifies the signals and provides the amplified signals to a combination AGC/Filter and Pulse Detector integrated circuit 19 in analog form (Analog Read Data). The combination of the AGC, filter and pulse detection functions is termed the read channel and integrating these functions in a single integrated circuit is common practice in the art as exemplified by the Silicon Systems SSI-3040 Read Channel integrated circuit. The pulse detector function of AGC/Filter and Pulse Detect circuit 19 (hereafter the read channel) translates analog read data into digital data and provides the digital data to an ENDEC and Data Separator/Synthesizer 21, such as the Western Digital WD10C27 integrated circuit, for processing and eventual transfer to the host system. Write data, received from the host system, is provided to the read/write preamplifier 18 by the ENDEC portion of circuit 21.

The digital data stream is monitored by a Servo Timing and Control integrated circuit 24, such as the Western Digital WD61C12 Servo Control integrated circuit. As the head 16 begins a pass over a servo sector, a servo address mark (SAM), recorded at the beginning of the servo sector, is provided on the digital data stream and detected by the Servo Timing and Control circuit 24. Servo Timing and Control circuit 24 then issues a timing signal (CNTRL) to a Servo Peak Detect and Demodulator integrated circuit 20 indicating the beginning of a servo field.

CNTRL is a timing signal having a characteristic length corresponding to the length of a servo burst field. As CNTRL is asserted, a timing window opens to Servo Peak Detect and Demodulator circuit 20 which indicates that analog data provided by the read/write preamplifier 18 now contains servo data and commands the Servo Peak Detect and Demodulator circuit 20 to begin operation. At the end of a servo burst field CNTRL is deasserted and the timing window closes. The cycle repeats at the occurrence of the next servo burst field comprising the servo sector.

Recording disks of conventional embedded servo disk drives typically include a multiplicity of servo sectors, with sixty or more being common. Each servo sector is offset from a preceding servo sector by a predetermined angular distance. When a recording disk is rotated at a constant angular velocity, each servo sector passes under the active read-write head in a predetermined angular phase relationship to the other servo sectors. Both servo sector phase timing and the length of a servo burst field within a servo sector phase are conventionally determined during the design process of an embedded servo system. Sector phase timing depends on the choice of rotational speed of the recording disk and the number of servo sectors intended for an optimum servo loop sampling rate. The size and quantity of servo burst fields within a servo sector are also a function of design choice. Servo sector phase timing and servo burst field quantity and length are, therefore, determinable quantities whose values are typically stored by conventional software means in timing control registers comprising Servo Timing and Control circuit 24. CNTRL is, therefore, a timing signal synchronized with the servo sector phases to define a succession of windows such that each window occurs while a servo burst is moving under the active head.

Servo data is read by the servo demodulator circuit 20 from the read channel circuit 19 after the AGC and filter stages only. Since servo data is taken from the read channel prior to pulse detection, servo data is provided to the servo demodulator circuit 20 in analog form. Servo Peak Detect and Demodulator 20 individually detects the analog servo burst peaks and demodulates their non-uniform magnitudes, thereby defining a servo burst amplitude characteristic which is taken to represent the amplitude of a burst as a whole.

Amplitude demodulated signals representative of a servo burst are provided by the servo demodulator 20 to a combination ADC/DAC integrated circuit 22 for conversion into digital signals capable of being read and processed by a digital processor. Demodulated servo burst signals are provided by ADC/DAC 22 to a signal bus for processing by Servo Timing and Control circuit 24 or, alternatively, a micro-processor (μP) 26 operating in conjunction with said servo controller, such as an Intel 83C196 micro-processor. μP 26 in combination with servo timing and control circuitry 24 detects the occurrence in time of servo burst fields and generates consecutive timing windows (CNTRL), the edges of which are used to command the servo demodulator 20 to detect and demodulate the amplitude of each burst and control the ADC/DAC 22 to convert each burst's demodulated amplitude into digital values. Although depicted as separate blocks, the ADC/DAC 22 and the Servo Peak Detect and Demodulator 20 are often integrated into a single integrated circuit. An example of such an integrated circuit incorporating both functions is the Analog Devices AD7775 Embedded Servo Front End chip. However, the AD7775 incorporates prior art techniques in the servo demodulation section.

Circuit means responsive to demodulated servo burst field amplitudes for producing a servo error signal for use in correcting any error in head position relative to a desired track centerline includes uP 26 and ADC/DAC circuit 22. Upon receipt of a set of demodulated servo burst amplitude signals comprising a servo sector, μP 26 computes a servo error signal, proportional to the degree and direction of transducer head displacement from track centerline as determined from the relative demodulated amplitudes of a set of A and B servo bursts. The servo error signal is provided on the signal bus to ADC/DAC circuit 22 for conversion into an analog value. The analog servo error signal is provided by the μP to an Actuator Motor Driver 30 which responsively produces a suitable electrical drive current to actuator motor 12 to control repositioning of head positioner actuator 14 and transducer head 16 over the desired track centerline.

A Disk Controller/Host Interface and Buffer Manager integrated circuit 28, such as a Western Digital WD61C23 Disk Controller, provides an interface between the signal processing circuitry of the disk drive and a host computer system. The Disk Controller provides host data to the ENDEC circuit 21 for recording on the disk as write data and receives read data from the ENDEC circuit 21 for transmission to the host. The Disk Controller further controls information transfer on the signal bus.

Figure 7:
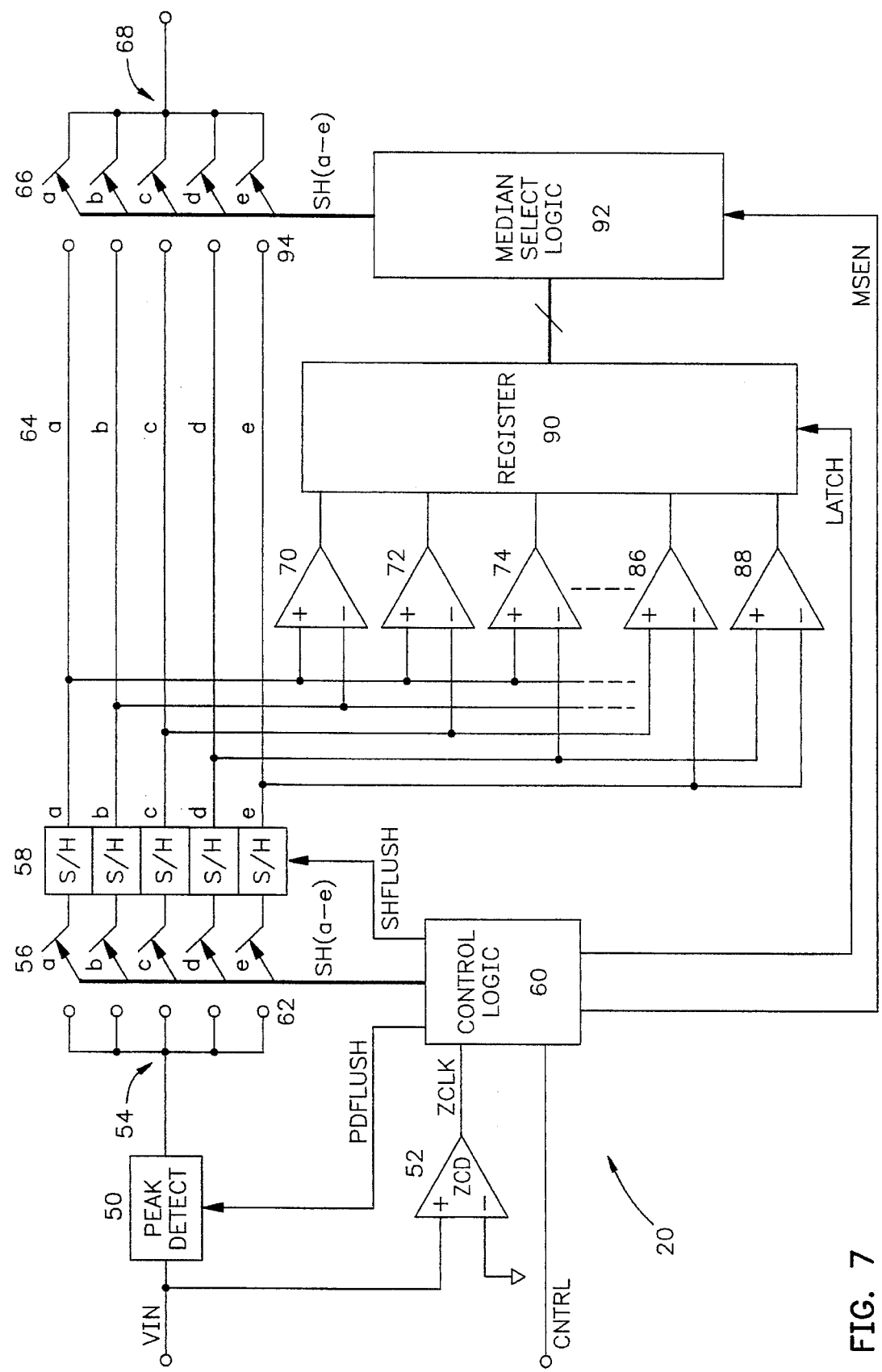
FIG. 7 is a block and schematic diagram of servo read signal processing circuitry in accord with the present invention.

In FIG. 7, Servo Peak Detect and Demodulator 20 (referred to hereafter as Median Peak Detector 20) includes detector circuit means for producing a detected signal that, during each servo burst timing window, successively represents the individual magnitudes of a plurality of the variable-magnitude peaks. Detector circuit means includes a peak detector 50 having a signal-processing input for receiving an alternating polarity servo read signal signal V representing a servo burst provided by the read channel circuit 19 of FIG. 1, a Zero Crossing Detector 52, and Control Logic 60 having a control input for receiving a timing signal CNTRL.

Figure 8:
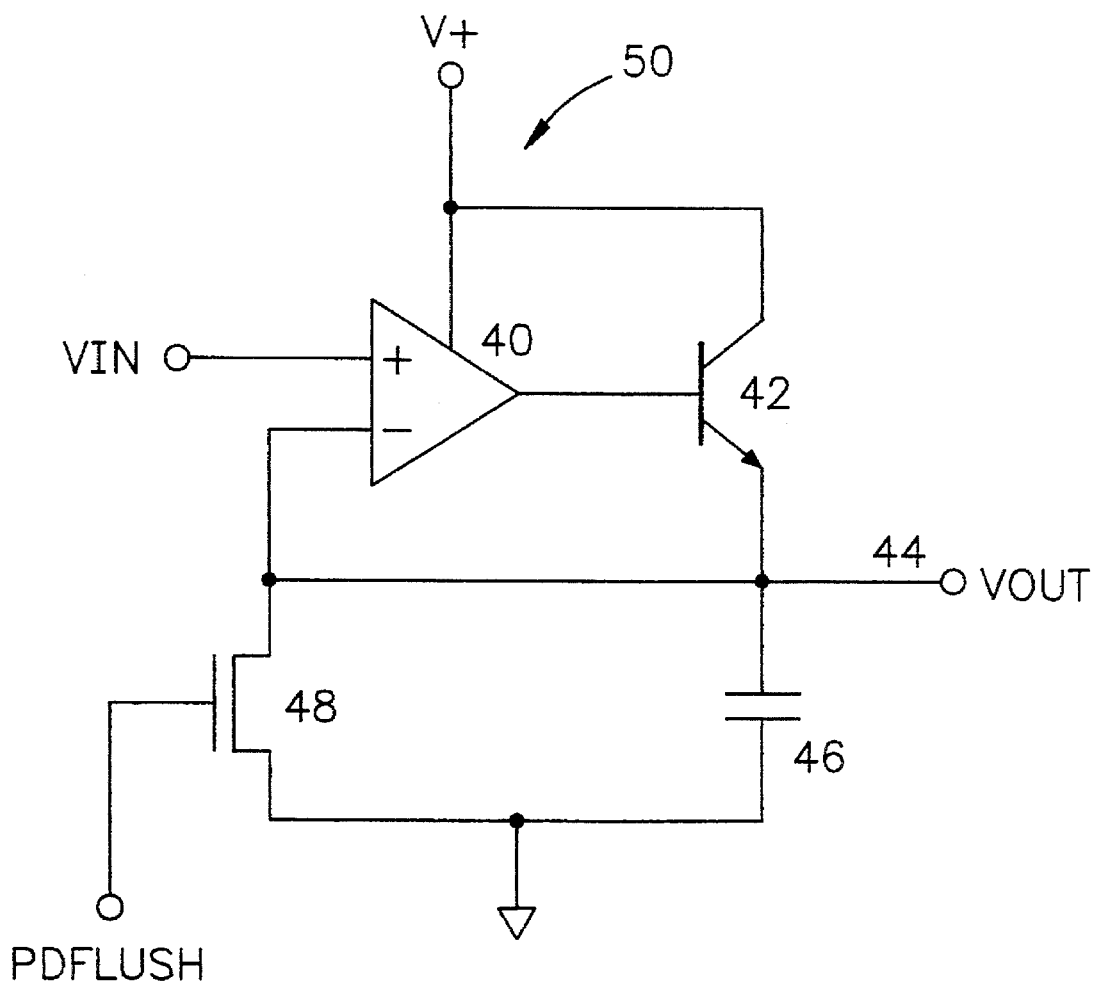
FIG. 8 is a circuit diagram of a peak detector circuit suitable for use in the circuitry of FIG. 7.

Peak detector 50 is suitably configured as a conventional positive peak detector which functions to provide an analog output voltage having a magnitude directly proportional to the maximum positive peak voltage value of an alternating polarity input signal. An example of a suitable positive peak detector is depicted in FIG. 8. An alternating polarity signal, $V_{IN}$, is applied to the non-inverting input of a conventional differential comparator 40 connected to operate as a unity gain follower. Transistor 42 provides a low impedance current source, having a base terminal connected to the output of the comparator, a collector terminal connected to a positive supply potential, and an emitter terminal connected to an output node 44 which is also connected to the inverting input of the comparator 40 thereby providing a feedback path. A holding capacitor 46 is connected between the output node 44 and ground. As $V_{IN}$ goes above ground potential, the output of the comparator goes high and current is conducted through transistor 42 to charge up holding capacitor 46.

The voltage developed across the holding capacitor 46 increases as $V_{IN}$ increases, reaches a final value as $V_{IN}$ reaches its peak value and remains steady at the final value as $V_{IN}$ decreases. The final voltage value developed across the capacitor is representative of the peak voltage magnitude of the positive input peak and is provided at the output node 44 as an output voltage $V_{OUT}$. A discharge transistor 48 is provided between the output node 44 and ground and connected in parallel with capacitor 46. When a signal PDFLUSH is applied to the gate of discharge transistor 48, the transistor shunts the current stored on the holding capacitor 46 to ground. The holding capacitor is thereby discharged and Vo is reset to ground potential. A next occurring positive peak in a train of alternating positive and negative peaks may now be separately detected and a next voltage value $V_{OUT}$ developed across capacitor 46 representative of the peak voltage magnitude of that next occurring peak.

Returning to FIG. 7, the output of peak detector 50 is connected to a common electrical node 54. A switch bank 56, comprising five individually engageable electrical switches (56a through 56e), is connected in series fashion with common node 54. Individual switches comprising the switch bank are connected in parallel fashion to each other, with each switch having one end connected to the common node.

Sample and hold bank 58 comprises five conventional sample and hold circuits (58a through 58e). Sample and hold bank 58 is connected in series relationship with the common node 54 and switch bank 56. Individual sample and hold circuits comprising the bank are connected in parallel fashion with each other, each having an input connected to a corresponding one of the individually engageable electrical switches (56a through 56e) of switch bank 56. As a switch is enabled, an electrical connection is closed between common node 54 and the corresponding sample and hold circuit connected to the switch. The analog output voltage of peak detector 50, provided on the common node, is thereby directed to a selected sample and hold circuit by energizing a corresponding switch.

Zero crossing detector (ZCD) 52 is configured, in the illustrated embodiment, as a conventional differential comparator having its non-inverting input tied to ground or a suitable reference potential and an alternating polarity input signal applied to its inverting input. ZCD 52 functions to provide a logical high signal (a logic one) at its output when the voltage value of an alternating polarity signal exceeds the value of the reference potential, and to provide a logical low (a logic zero) at its output when the voltage value of the alternating polarity signal is below the value of the reference potential. ZCD 52 provides a digital output signal having a low-to-high transition at the point where an alternating polarity input signal crosses the reference potential in the positive direction, and having a high-to-low transition at the point where an alternating polarity input signal crosses the reference potential in the negative direction. The ZCD output signal may be viewed as a clock signal whose transition edges define a timing interval having a periodicity exactly equal to the periodicity of the alternating polarity input signal.

Control logic 60 provides timing, control and enable signals for use by other circuit elements depicted in FIG. 7. Control logic 60 has a control input, responsive to a timing signal CNTRL, provided by timing and control processor 24 of FIG. 1, and which functions to provide start/stop signals to control logic 60 indicating the beginning and end of a particular control cycle. CNTRL is conventionally provided by the timing and control processor in sync with servo sector phases and defines a succession of timing windows, each occurring while a servo burst is moving under an active read-write head and within which control logic 60 is operational.

The output of ZCD 52 is also connected as an input to control logic 60 and functions as an interval timing signal source. Control logic 60 is connected to peak detector 50 by means of an output control line PDFLUSH, and is further connected to the switches (56a through 56e) of switch bank 56 by a set of switch control lines (indicated generally at 62) equal in number to the switches in the bank, that provide energizing signals to the switches. Each one of the switches in switch bank 56 is connected to a corresponding one of the switch control lines, each control line selectively enabling each respective one of the switches. In a manner to be described more fully in connection with the operation of the invention, control logic 60 issues selective enabling signals to switch bank 56, enabling selected switches and closing the electrical circuit between the peak detector 50 and a selected sample and hold circuit of sample and hold bank 58. A sample and hold circuit is selected by providing an enable signal on a corresponding signal line which enables a corresponding switch. The peak detector output $V_{OUT}$ is thereby directed to the selected sample and hold circuit by means of control logic circuitry 60.

Each sample and hold circuit (58a through 58e) further includes a corresponding output line (64a through 64e) with the output lines disposed in parallel fashion to each other. A second switch bank, termed peak select switch bank 66, comprising a second set of selectively engageable switches (66a through 66e), equal in number to the sample and hold output lines, is connected in series fashion between the sample and hold output signal lines and a common output node 68. Switches comprising peak select switch bank 66 are disposed in parallel relationship with each other, however each individual switch is connected in series relationship between a corresponding sample and hold output signal line and common output node 68.

As an analog voltage $V_{OUT}$ from peak detector 50 is directed to a selected sample and hold circuit by energizing a respective switch of switch bank 56, its magnitude is sampled and held by the selected sample and hold circuit. Each sample and hold circuit functions to provide a held analog signal, hereafter termed a held peak magnitude, representing the magnitude of the positive voltage excursion of a peak detected by peak detector 50, on its corresponding output signal line. Peak select switch bank 66 functions to selectively connect one of the parallel sample and hold output lines to the common output node 68 thereby providing the corresponding held peak magnitude to the output.

An additional signal SHFLUSH is provided to sample and hold bank 58 by control logic 60 and is connected in common to all sample and hold circuits comprising the bank. SHFLUSH functions to flush signals held by the sample and hold circuits and reset the sample and hold outputs to ground potential.

Ten (10) differential comparators, of which five (5) are shown, 70, 72, 74, 86, and 88, are configured in an array, each having an inverting input, a non-inverting input and an output. The inverting and non-inverting inputs of each comparator in the array are connected to two of the parallel set of sample and hold output lines (inverting to one and non-inverting to a second) in a manner such that the array of comparators functions to compare each respective one of the held peak magnitude signals contained thereon with all remaining other held peak magnitude signals. Each comparator of the array compares two of the peak magnitudes, generating a logical one output signal in the case of a peak magnitude applied to the non-inverting input being of greater magnitude than a peak magnitude applied to the inverting input, and generating a logical zero output signal should the reverse be the case.

The number of comparators required to insure a complete comparison of all peak magnitudes to each other depends on the number of peak magnitudes to be compared. In the case of conventional two input comparators, as shown in the embodiment, the required number may be determined with reference to the following equation;

$$\sum_{1}^{N}(N-i)$$

where N is the number of sample and hold circuits whose output voltage magnitudes are desired to be compared. For the five sample and hold circuits, in the example of the invention, an array of ten comparators are required to perform a complete magnitude comparison. Their inverting inputs and non-inverting inputs are connected to the sample and hold output lines in accordance with the following table, TABLE 1.

TABLE 1

| COMPARATOR | NON-INVERT. INPUT | INVERT. INPUT. | COMPARISON | TRUE | FALSE |
| --- | --- | --- | --- | --- | --- |
| 70 | 64a | 64b | a≧b | 1 | 0 |
| 72 | 64a | 64c | a≧c | 1 | 0 |
| 74 | 64a | 64d | a≧d | 1 | 0 |
| 76 | 64a | 64e | a≧e | 1 | 0 |
| 78 | 64b | 64c | b≧c | 1 | 0 |
| 80 | 64b | 64d | b≧d | 1 | 0 |
| 82 | 64b | 64e | b≧e | 1 | 0 |
| 84 | 64c | 64d | c≧d | 1 | 0 |
| 86 | 64c | 64e | c≧e | 1 | 0 |
| 88 | 64d | 64e | d≧e | 1 | 0 |

As shown in TABLE 1., each held peak magnitude is compared to each respective other held peak magnitude, each comparator returning a one (1) on the output if a voltage on the non-inverting input is greater in magnitude than a voltage on the inverting input (non-inverting greater than inverting is true), and returning a zero (0) if the voltage on the non-inverting input is less than or equal to the voltage on the inverting input (non-inverting greater than inverting is false). The comparator array may be viewed, therefore, as circuit means for encoding the relative magnitudes of the peak magnitudes into an intermediate digital word representative of the relative rankings of said relative magnitudes. For example, if the five peak magnitudes were to have relative magnitudes, in increasing order, of e<c<a<b<d, the comparator array would provide a encoded digital word of 0 1 0 1 1 0 1 0 1 1, with the leftmost bit (0) provided by comparator 70, the next leftmost bit (1) provided by comparator 72 and so on, in order, to the right most bit (1) provided by comparator 88.

The digital word, encoded by the comparator array, is latched into a conventional parallel-in parallel-out register 90, in response to a control signal LATCH issued by the control logic 60. Register 90 is connected to median select logic 92, wherein the digital word latched into register 90 is decoded by median select logic 92, which functions, in a manner to be described with reference to the operation of the invention below, to determine which of the ranked peak magnitudes will be defined as a median peak magnitude; the median defined as that peak magnitude having an equal number of peak magnitudes greater than or equal to itself than peak magnitudes less than or equal to itself. In the example of the five peak magnitudes referred to above, e<c<a<b<d, a would be defined as having the median value, there being two peak magnitudes less than a (e and c) and two peak magnitudes greater than a (b and d).

Median select logic 92 is also connected to control logic circuitry 60 and operatively responsive to a control signal, median select enable MSEN, provided by the control logic.

Median select logic 92 is further connected to the switches (66a through 66e) of peak select switch bank 66 by a set of select control lines (indicated generally at 94) equal in number to the switches in the bank, that provide energizing signals to the switches. Each one of the switches in peak select switch bank 66 is connected to a corresponding one of the select control lines, each select control line selectively enabling each respective one of the switches. In a manner to be described more fully in connection with the operation of the invention, median select logic 92 issues a selective enabling signal to peak select switch bank 66, enabling a selected switch and closing the electrical circuit between a corresponding sample and hold output line and the common output node 68. The switch chosen closes the circuit between the output node 68 and the sample and hold circuit holding the peak magnitude determined to be the median.

Figure 9:
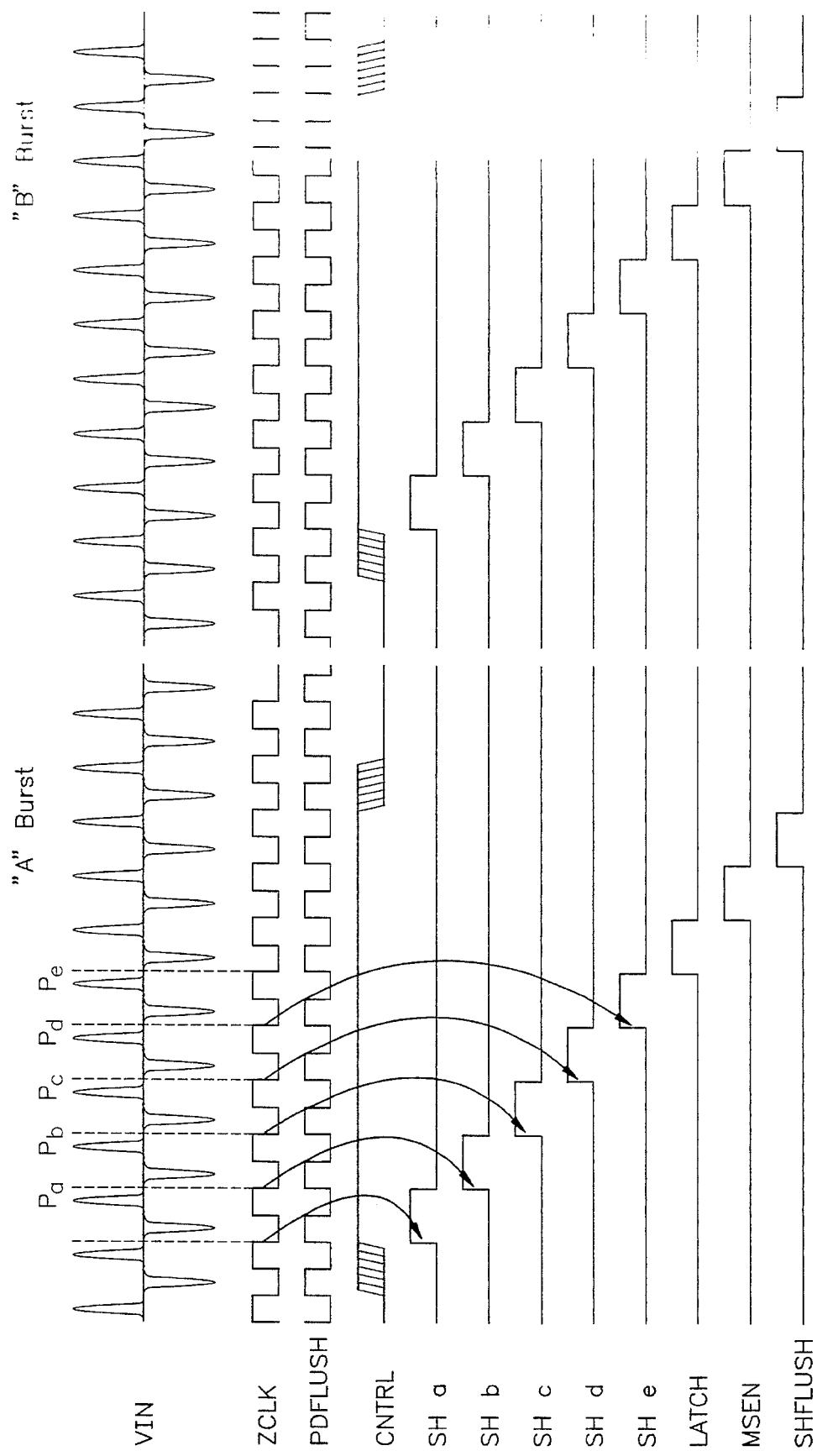
FIG. 9 is a timing and waveform diagram illustrating the operation of the circuitry of FIG. 7.

The operation of the median peak detector can best be understood with reference to the waveform timing diagram of FIG. 9. In FIG. 9, a signal-processing input receives a servo read signal, $V_{IN}$, an alternating polarity analog signal comprising positive and negative polarity regions. In the illustrated embodiment, the peaks detected occur in the positive region. The servo error signal, $V_{IN}$, represents A and B servo bursts such as those read from a magnetic storage disk by a read/write transducer head in a hard disk drive system such as that described with reference to FIG. 1. When a servo burst field is encountered by the read/write head, burst information is conventionally provided, through the read/write amplifier and read channel pulse detector, to the invention as $V_{IN}$. As shown in FIG. 7, $V_{IN}$ is directed to a peak detector 50 and zero crossing detector (ZCD) 52. As described previously, ZCD 52 provides a timing signal ZCLK (FIG. 9, ZCLK) defining a timing interval having a periodicity equal to the periodicity of $V_{IN}$, a rising edge occurring at the time the $V_{IN}$ signal polarity crosses zero going from negative to positive, and a falling edge occurring at the time the $V_{IN}$ signal polarity crosses zero going from positive to negative. ZCLK, therefore, may be viewed as means for defining successive timing intervals each of which corresponds to the occurrence of a peak region in the $V_{IN}$ signal; successive like edge transitions defining the beginning and end of each timing interval. The choice of falling edges defining the start and rising edges defining the end, or vice versa, is a matter of convenience.

Peak detector 50, detects positive going peaks of $V_{IN}$, in the manner described previously, and stores a voltage value, representative of the maximum positive voltage excursion reached by a $V_{IN}$ peak, across a storage capacitor (FIG. 8, 46). The stored voltage is further provided on an output node (FIG. 8, 44) connected to a multiplexed conductor 54. From multiplexor 54, the peak detector output voltage is directed to a selected one of a bank of conventional sample and hold circuits 58 where its voltage value is sampled, held and reflected on a corresponding one of a plurality of sample and hold output lines 64a, 64b, 64c, 64d or 64e. The selection of a selected one of the sample and hold circuits to sample and hold the value of the peak detector output voltage is performed by energizing a corresponding one of a bank of electrical switches 56 by providing a selection signal from control logic 60 over a corresponding one of switch control lines 62a, 62b, 62c, 62d or 62e.

In the timing diagram of FIG. 9, switch control signals SHa, SHb, SHc, SHd and SHe are toggled in sequential fashion, with each switch control signal energizing a correspondingly identified switch of switch bank 56 when in the high state and de-energizing said corresponding switch when in the low state. A timing signal, CNTRL, provided by an external timing and control processor (24 of FIG. 1) to control logic 60, is asserted to a logic high state, indicating the beginning of a servo burst timing window. It may be asserted at the beginning of a burst or, at a designer's convenience, may be asserted after a pre-determined number of burst peaks have occurred, or a pre-determined time interval has passed, in order to allow the signal to settle.

At the first high to low transition of ZCLK after CNTRL is asserted, a first switch control signal, SHa, makes a transition from the low to high state, thereby energizing corresponding switch 56a closing the electrical connection between the peak detector output and the corresponding sample and hold 58a. A low to high transition of ZCLK marks in time a positive going zero crossing of alternating polarity input signal $V_{IN}$ indicating the beginning of a positive peak region designated in the timing diagram of FIG. 9 as peak Pa. Peak Pa is detected by peak detector 50 in the manner described with reference to FIG. 8 and generates a peak detector output voltage, representing the peak magnitude of peak Pa, which is directed to sample and hold 58a by switch control signal SHa. A peak detector flush signal, PDFLUSH, is provided by control logic 60 to peak detector 50 which flushes the output voltage, corresponding to peak Pa, from the peak detector 50, by enabling a shunt transistor (28 in FIG. 8) connected between holding capacitor 46 and ground, thereby discharging the capacitor and resetting peak detector 50 to capture a next occurring positive peak in the $V_{IN}$ signal. In order to insure that the entire positive peak region is captured by the peak detector before capacitor 46 is discharged, PDFLUSH is provided 180 degrees out of phase with ZCLK. ZCLK's falling edge, marking in time the end of a positive peak region, triggers the rising edge of PDFLUSH which discharges capacitor 46. A falling edge of PDFLUSH turns off shunt transistor 48 in sync with a next rising edge of ZCLK, marking in time the beginning of a next occurring positive peak region.

Peak magnitudes are directed to sample and hold circuits in a sequential fashion by control logic 60. A high to low transition (falling edge) of ZCLK marks, in time, the beginning of a timing interval within which a positive peak region of a servo burst is detected by peak detector 50 and directed to a selected sample and hold circuit. In a first timing interval (ZCLK falling edge), the first switch control signal SHa is asserted in response thereto, closing the electrical connection between the peak detector 50 and sample and hold 58a. As ZCLK makes a high to low transition, PDFLUSH goes from low to high (rising edge). Any prior peaks detected by peak detector 50 are flushed and its output is held at ground potential during the negative peak region. As ZCLK transitions from low to high, marking a positive peak region, PDFLUSH goes low allowing an analog voltage to develop on peak detector 50 representing a peak magnitude of positive peak Pa which is sampled and held by sample and hold circuit 58a.

At the next falling edge of ZCLK, the first timing interval ends, switch 56a is de-energized and a second timing interval begins. PDFLUSH rises, flushing the analog signal representing the magnitude of peak Pa from peak detector 50 and holding the output at ground potential. Switch control signal SHb is asserted, connecting sample and hold 58b to the peak detector. The positive going portion of peak Pb is sampled and held by sample and hold circuit 58b in the same manner as described for peak Pa.

The third falling edge of ZCLK, after assertion of CNTRL, defines the beginning of a third timing interval in which the peak magnitude of positive peak Pc is directed to sample and hold circuit 58c by assertion of switch control signal SHc.

Control logic 60 taken in combination with ZCD 52 and switch bank 56 can be viewed therefore as comprising means for defining a timing interval within which a peak magnitude is captured, sampled and held. The process repeats, with each ZCLK falling edge defining the beginning of a next sequential timing interval within which each next sequential positive peak Pi is detected in turn and a voltage value representing its peak magnitude directed to a corresponding next sample and hold circuit $58_i$, until all sample and hold circuits hold a peak magnitude value. Three further signals, LATCH, MSEN and SHFLUSH are provided by control logic 60 in the same manner as SHa through SHe. The function of each will be described below in the context of median peak selection.

After each signal shown in FIG. 9 (SHa through SHFLUSH) is sequentially indexed by control logic 60, timing and control signal CNTRL transitions from a high to low state, indicating the end of a servo burst timing window. In the example of FIG. 9, the first high to low transition of CNTRL marks the close of a timing window with respect to an A burst of a servo signal. The next low to high transition of CNTRL marks the opening of a timing window with respect to a B burst of a servo signal. Although FIG. 9 depicts timings associated with a two burst servo system, A and B, it should be recognized that servo systems comprising more than two bursts may be easily accommodated by asserting additional CNTRL signals.

Figure 10:
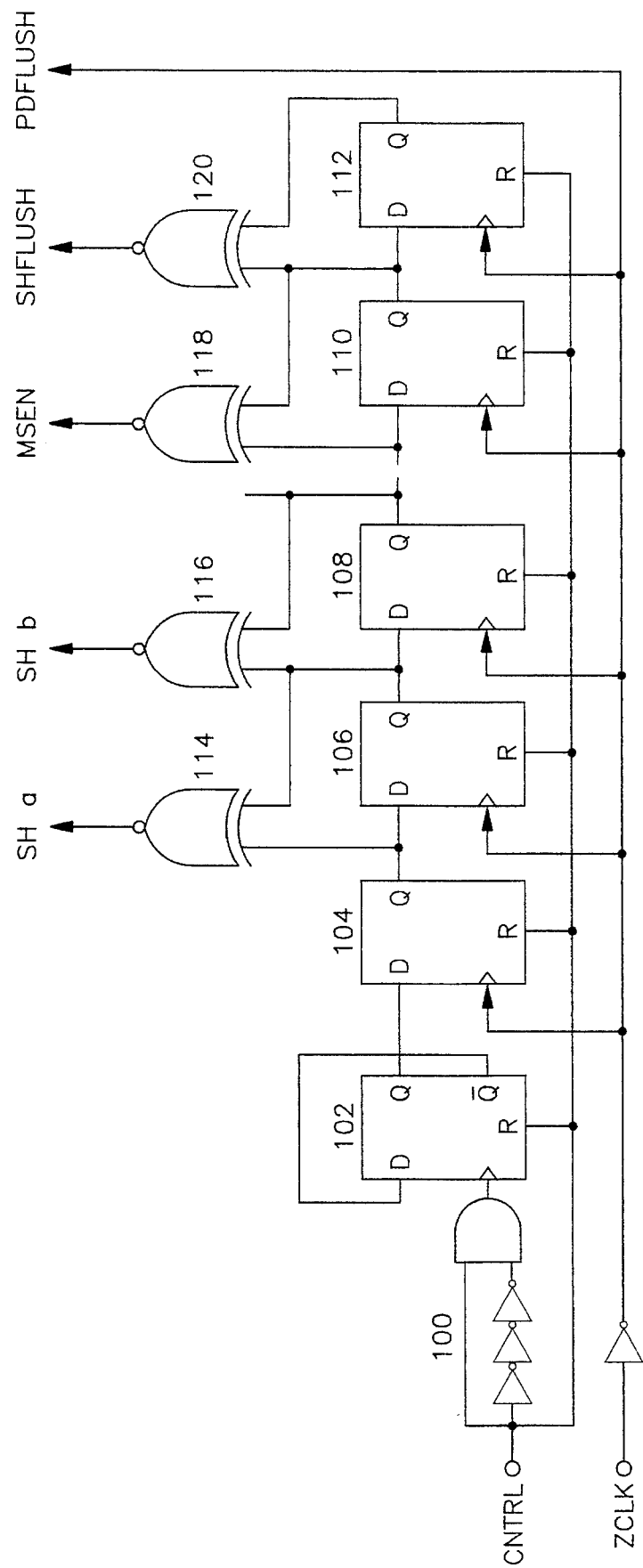
FIG. 10 is a logic diagram of control logic circuitry depicted in FIG. 7.

FIG. 10 is a logic diagram of control logic 60 depicting one means of generating the timing waveforms of FIG. 9. A string of conventional D flip-flops 104, 106, 108, 110 and 112 are connected in series with each having a D input connected to the non-inverting Q output of the preceding flip-flop, each having a reset input connected in common to CNTRL and each having a clock input connected in common to a signal line $\overline{ZCLK}$ connected in turn to ZCLK through a conventional invertor. $\overline{ZCLK}$ is further connected to an output signal line PDFLUSH and provides a signal 180 degrees out of phase with ZCLK to peak detector 50. Two input exclusive or gates (XOR) 114, 116, 118 and 120 are connected between the flip-flops of the string with each XOR having a first input connected to the Q output of a first flip-flop and a second input connected to the Q output of the next occurring flip-flop of the string. For example, XOR 114 has its first input connected to the Q output of flip-flop 104 and its second input connected to the Q output of flip-flop 106. XOR 116 has its first and second inputs connected to the Q outputs of flip-flops 106 and 108 respectively. XOR 118 is connected similarly to flip-flops 108 and 110, while XOR 120 is connected to flip-flops 110 and 112. Each XOR further has an output from which the control signals SHa through SHe, LATCH, MSEN and SHFLUSH may be taken. For the sake of brevity, only the circuitry necessary to generate SHa, SHb, MSEN and SHFLUSH is described with reference to FIG. 10. However, it will be apparent, to one ordinarily skilled in the art, that any number of additional signals may be generated by the circuit of FIG. 10 by providing additional flip-flops and XORs to the string.

As previously described, each flip-flop in the chain, and flip-flop 102, has a reset input connected to CNTRL which is initially in a logical low state. According to convention, when reset is in the low state, the Q output of a flip-flop is held likewise in the low state no matter what the logic state of the input. A low, therefore, is applied to both inputs of each XOR, by virtue of each flip-flop in the chain having a low on its Q output, and each XOR providing, in turn, a low at its output in accordance with convention. As CNTRL is asserted high, indicating the opening of a timing window, reset is released on each of the flip-flops, allowing each flip-flop to operate normally by latching the logical value on the D input to the Q output on each positive going edge of the clock signal. Since each D input is at a logical zero initially, no change occurs at the output of any flip-flop connected to an XOR, and the outputs of the XORs remain at zero.

CNTRL is also connected to the clock input of sync flip-flop 102 through a conventional one-shot 100. Sync flip-flop 102 further has an inverting output $\overline{Q}$ connected to its D input. Since Q is initially at a logic low, $\overline{Q}$ is therefore high and this logic high is applied to the D input of sync flip-flop 102, which logic high will be latched to the Q output, upon release of the reset signal, by the next low to high transition on the clock input. CNTRL going high triggers one-shot 100, providing a low to high transition on the clock input of flip-flop 102, thereby latching the logic high on the D input to the Q output. $\overline{Q}$ conventionally goes to the opposite logic state (low) which is again fed back to the D input. One-shot 100 returns to zero and no further clock transitions are provided to sync flip-flop 102 until CNTRL once again changes state. The Q output of sync flip-flop 102 thus remains in the high state.

A logic high now appears at the D input of flip-flop 104, which high will be latched to the Q output on the next successive low to high transition of $\overline{ZCLK}$; a low to high transition of $\overline{ZCLK}$ will be referred to hereafter as, simply, a clock. At this next clock, the high on D 104, will be latched to Q 104, and by means of direct connection, to D 106. The same high will be applied to the first input of XOR 114, to be exclusively or'd with a zero from Q 106. This results in, conventionally, a one at the output of XOR 114. At the next successive clock, a high on D 106 is latched to Q 106 and is applied to D 108, the second input of XOR 114 and the first input of XOR 116. Since XOR 114 now has a high on both inputs, the output of XOR 114 goes to zero. XOR 116 goes to a one by virtue of having a one on its first input and a zero on its second. At the next successive clock, the one on D 108 is latched to Q 108, D 110, the second input of XOR 116 and the first input of XOR 18. XOR 116 thus returns to zero, while XOR 118 goes to one. The process repeats, at the next successive clock, with the one on D 110 being latched to Q 110, D 112, the second input of XOR 118 and the first input of XOR 120. XOR 118 returns to zero, while XOR 120 goes to one. At the next successive clock, the cycle terminates, with the one on D 112 being latched to Q 112 which returns XOR 120 to zero. Since each flip-flop, operating conventionally, is held in the one state (a one at the Q output), further clocks do not alter the state of the flip-flop string and no further changes occur in the output state of the XORs.

Taking timing signal CNTRL low, indicating the close of a timing window, resets all of the flip-flops by setting all of their Q outputs to zero. Since all XORs have been returned to zero during normal operation of the circuit, resetting the flip-flops has no effect on the output of the XORs, which will conventionally output a zero when both inputs are zero. CNTRL going low also resets one-shot 100 to provide a clock pulse to flip-flop 102 at the next rising edge transition of CNTRL.

Operating in the manner described, control logic 60 provides sequential output signals, operatively responsive to a control signal CNTRL and a clock signal $\overline{ZCLK}$, where each successive one of the output signals is in the high state for a time period equal to the time period between two successive clock rising edge transitions, the first clock rising edge transition triggering a first output signal into the high state and the second clock rising edge transition returning said first output signal into a low state and triggering a next successive output signal into the high state. Since $\overline{ZCLK}$ is defined as the inverted value of ZCLK, a rising edge of $\overline{ZCLK}$ marks, in time, the beginning of a periodic timing interval in synchronous fashion with the occurrence of peaks in a periodic alternating polarity servo read signal. Sequential peaks generate sequential successive output signals, which signals, when connected to switch bank 56 by switch control lines 62a through 62e provide switch control signals SHa through SHe. Switches 56a through 56e are sequenced, in a synchronous relationship to the occurrence of a peak, to direct a peak magnitude value for each sequential positive peak to a corresponding sample and hold 58a through 58e.

As many or as few positive peaks may be detected and directed to a corresponding sample and hold circuit as there are switch, control signal and sample and hold combinations. In the illustrated embodiment, five sample and holds have been provided to sample and hold peak magnitude values of five sequentially occurring positive peaks.

Returning to FIG. 7, the peak magnitudes of five sequential peaks have been sequentially directed to sample and holds 58a through 58e. Each peak magnitude so held is applied to a corresponding sample and hold output line 64a through 64e respectively. The magnitudes of the peak magnitudes are then compared by a bank of two input differential comparators (70 through 88 even numbers) which are connected to output lines 64a through 64e. Each comparator is connected to two separate sample and hold output lines and each output line is connected to at least two comparators in an array configuration that insures that each peak magnitude is compared in value to all other peak magnitudes. In the illustrated embodiment, where there are five peak magnitudes to be compared, ten comparators are provided, as indicated by the equation noted with respect to the construction of the invention above.

Each comparator is configured, in conventional fashion, to output a one if the peak magnitude on a first input is larger in value than a peak magnitude on a second input and output a zero if the peak magnitude on the first input is less than or equal to the peak magnitude on the second input, or $C_{ij}=1$, if $i \geq j$ and $C_{ij}=0$, if $i<j$. The comparator bank output is conveniently described in terms of a ten bit digital word, with each bit representing the results of a comparison between two peak magnitude values.

Because peak magnitudes are sequentially directed to sample and hold circuits and therefore sequentially applied to the sample and hold output lines and provided in a non-simultaneous fashion to comparators in the bank, latch means are provided to capture the ten bit digital word in a register 90 after sufficient time for all sample and holds to be loaded with a peak magnitude and all comparisons to be completed. Register 90 may be any suitable one of a number of conventional parallel-in parallel-out register designs capable of latching a ten bit word. Register means further includes a latch enable signal LATCH which enables the latch function and is provided by control logic 60. Referring to FIG. 9, LATCH is the nextmost signal provided by control logic 60 after the last switch control signal SHe. LATCH may be suitably provided by insertion of a flip-flop/XOR pair into the logic circuitry of FIG. 10 in the required sequential position, thereby enabling the register 90 only after all sample and holds have been loaded with peak magnitudes, forcing completion of all comparisons. After latching the ten bit comparison results, register 90 provides the ten bit digital word to median select logic 92 which decodes the digital word in order to determine which peak, on the basis of comparisons with all others, has the median value.

Figure 11:
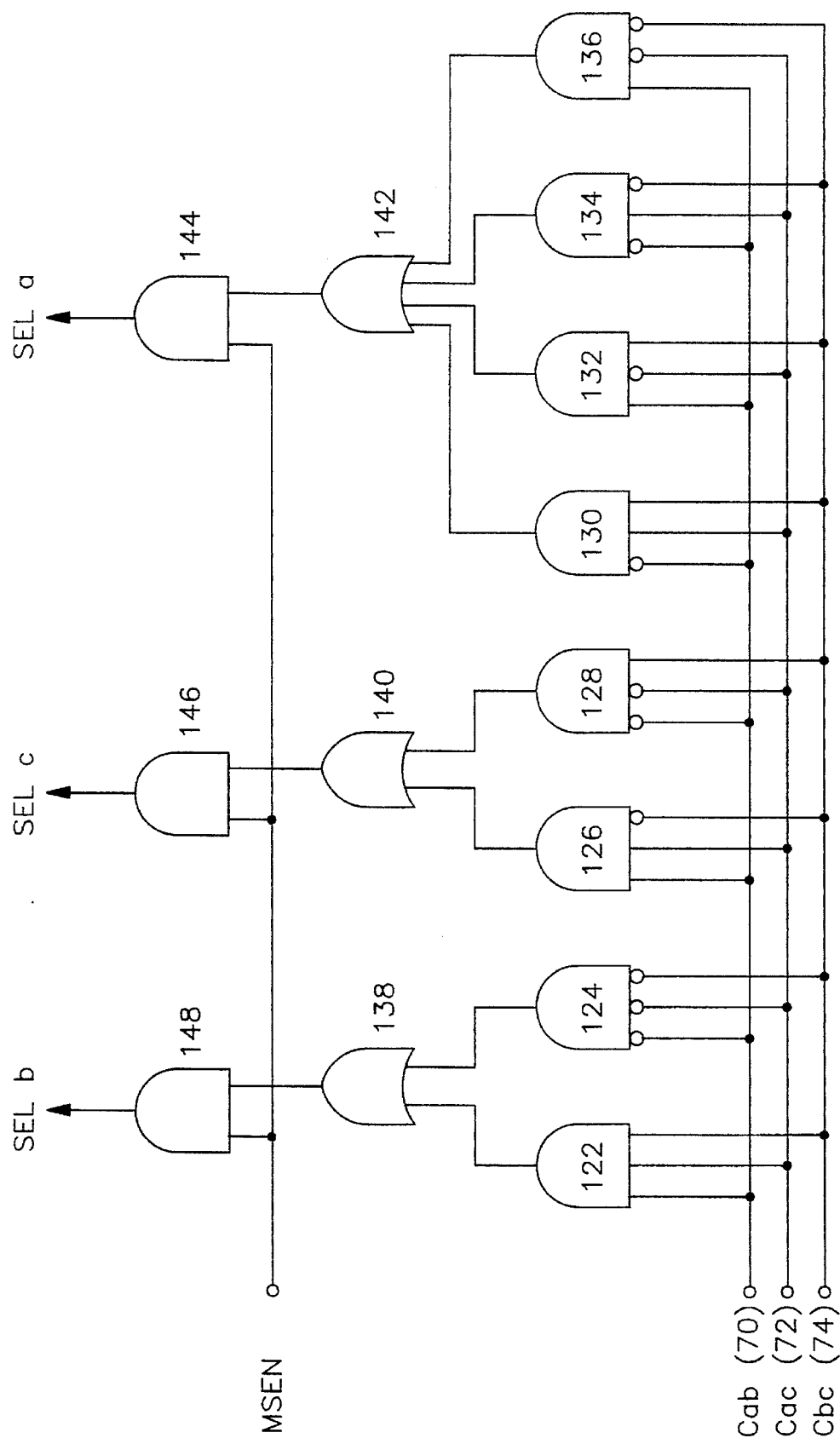
FIG. 11 is a logic diagram of median select decode logic depicted in FIG. 7.

FIG. 11 is a logic diagram depicting exemplary logic that may be used by median select logic 92 to accomplish decoding of a digital word, representing a ranking order of the relative values of peak magnitudes, and provide a signal identifying which of the compared peak magnitudes has a median value. For illustrative purposes only, logic circuitry is shown for decoding a three bit digital word representing the possible comparison results of three peak magnitudes a, b, and c, but the principles of operation of the logic circuitry of FIG. 11 may be extended, by one ordinarily skilled in the art, to decode as large a digital input word as may be required.

Three input lines are provided to the logic circuitry of FIG. 11 for carrying the comparison results Cab, Cac and Cbc of three peaks a, b and c, such as might be output by differential comparators 72, 74 and 76 of FIG. 7. A first input line is connected to a first input of each of an array of eight three input AND gates 122, 124, 126, 128, 130, 132, 134 and 136. A second input line is connected to a second input of each of said AND gates and a third input line is connected to a third input of each of the AND gates. AND gate 122 has an output connected to a first input of OR gate 138 whose second input is an output of AND gate 124. Similarly, AND gate 126 has an output connected to a first input of OR gate 140 whose second input is an output of AND gate 128. OR gate 142 is a four input OR gate whose first through fourth inputs are the outputs of AND gates 130, 132, 134 and 138 respectively.

Three additional two input AND gates 144, 146 and 148 are depicted in FIG. 11 each having a first input connected respectively to the outputs of OR gates 142, 140 and 138 and a second input connected in common to a signal line MSEN connected in turn to control logic 60 of FIG. 7. Following convention, each AND gate 144, 146 and 148 will provide an output reflecting the logic level provided at its first input from OR gate 142, 140 and 138 respectively, when its second input is enabled by MSEN being in a high state.

OR gate 138 has an output, which when ANDed with MSEN at AND gate 148, is defined as SELb and designates the b peak as the median in the event that OR 138 and therefore SELb is a logical one. OR gate 140 similarly defines an output SELc and designates the c peak as the median in the event that SELc is a logical one and OR gate 142 similarly defines SELa designating the a peak as the median in the event that SELa is a logic one. AND gate 124 further provides for a logical inversion of a signal on each of its three inputs. AND gate 126 provides for a logical inversion on the third input, AND gate 128 on the first and second input, AND gate 130 on the first input, AND gate 132 on the second, AND gate 134 on the first and third and AND gate 136 provides for a logical inversion on the second and third inputs. The operation of the exemplary median select logic of FIG. 11 is best described in the context of a truth table as illustrated in TABLE 2.

TABLE 2

| Input Word | | | | | | | | | | | Peak Select | | |
|---|---|---|---|---|---|---|---|---|---|---|---|---|---|
| a≥b Cab | a≥c Cac | b≥c Cbc | 122 | 124 | 126 | 128 | 130 | 132 | 134 | 136 | b 138 | c 140 | a 142 |
| 0 | 0 | 0 | 0 | 1 | 0 | 0 | 0 | 0 | 0 | 0 | 1 | 0 | 0 |
| 0 | 0 | 1 | 0 | 0 | 0 | 1 | 0 | 0 | 0 | 0 | 0 | 1 | 0 |
| *0 | 1 | 0 | 0 | 0 | 0 | 0 | 0 | 1 | 0 | 0 | 0 | 0 | 1 |
| 0 | 1 | 1 | 0 | 0 | 0 | 0 | 1 | 0 | 0 | 0 | 0 | 0 | 1 |
| 1 | 0 | 0 | 0 | 0 | 0 | 0 | 0 | 0 | 1 | 0 | 0 | 0 | 1 |
| *1 | 0 | 1 | 0 | 0 | 0 | 0 | 1 | 0 | 0 | 0 | 0 | 0 | 1 |
| 1 | 1 | 0 | 0 | 0 | 1 | 0 | 0 | 0 | 0 | 0 | 0 | 1 | 0 |
| 1 | 1 | 1 | 1 | 0 | 0 | 0 | 0 | 0 | 0 | 0 | 1 | 0 | 0 |

In TABLE 2, the input word represents all possible combinations of a three bit digital word representing the relative magnitudes of peaks a, b and c. A 1 in a bit position indicates that the comparison condition at the column heading, a≥b, a≥c or b≥c is true, a zero indicates the comparison condition is false. The truth table of TABLE 2, describes the state conditions of the AND and OR gates of FIG. 11 for the following relative peak magnitudes; row 1=a≥b≥c, row 2=c≥b≥a, row 3=a=b=c, row 4=b≥a≥c, row 5=c≥a≥b, row 6=a=b=c, row 7=a≥c≥b and row 8=c≥b≥a. Given a three bit input word, at the beginning of any row, the next sequence of eight bits in the row are the corresponding output states of the eight AND gates depicted in FIG. 11, while the next sequence of three bits in the row are the corresponding output states of the indicated OR gates. A 1 in an OR gate column has the function of selecting the particular peak identified at the head of the column as the peak having the median value of the three.

Two special conditions, noted in TABLE 2 at row 3 and row 6, represent conditions where the three bit word represents a logical improbability. These words may be returned by the comparator bank in situations where the sampled peaks all have the same value, ie., a=b=c. In such cases, a tie-breaker decision is made, wherein peak a is arbitrarily chosen as the one having the median value. Since the peak values are equal to each other, a choice of median peak may be made merely for the sake of convenience. AND gates 132 and 134 and four input OR gate 142 implement the tie-breaker function in FIG. 11, but both AND gates could easily be reconfigured, by a routineer in the art, along with OR gate 140, or OR gate 138 to arbitrarily select peak b or peak c as the median in the event of a tie.

The function of MSEN, in the example of the present invention, is to prevent assertion of an output signal, indicating the selection of a median peak, until the application of comparison results to median select logic has reached equilibrium. Until equilibrium has been reached, the output states of OR gates 138, 140 and 142 may be susceptible to noise or oscillation, thereby momentarily selecting a false peak as the median. After signal settling, MSEN is asserted, passing the logic values appearing at the outputs of the OR gates 142, 140 and 138 to the outputs of the AND gates 144, 146 and 148 respectively. MSEN is generated by control logic 60 in a manner similar to generation of the latch signal LATCH described above. MSEN may be provided by insertion of a flip-flop/XOR gate pair into the chain of such pairs in the appropriate position in the logic circuit of FIG. 10.

MSEN provides a further function of controlling the timing of a flush signal SHFLUSH, provided by control logic 60, and applied to the sample and holds comprising sample and hold bank 58. SHFLUSH discharges the peak magnitudes held on the sample and holds in the same manner as PDFLUSH, described in the context of peak detector 50 of FIG. 8, discharges the holding capacitor 46 and resets the circuit. MSEN provides means for insuring that the logic circuitry of median select logic 92 has reached stability and that a true median has been selected before the peak values held in sample and hold bank 58 are flushed.

Returning to FIG. 7, median select logic 92 is connected to peak select switch bank 66 by means of control lines SELa, SELb, SELc, SELd and SELe. As a median peak is selected by median select logic, a high level signal is applied to a respectively indexed control line; selected peak a corresponding to a one on control line SELa, selected peak b corresponding to a one on control line SELb, and so on. In the same manner as described for the operation of switch bank 56 above, control lines SELa through SELe energize respective ones of the switches, thereby completing an electrical circuit between output node 68 and a respectively indexed one of sample and hold output lines 64a through 64e. If for example peak b is selected as having the median value, output line SELb would energize switch 66b, connecting sample and hold output line 64b to output node 68. The peak magnitude value held in sample and hold 58b now defines the stored median peak detector output voltage $V_{OUT}$ which may be provided to additional external circuitry, such as an ADC depicted in FIG. 1.

In the timing interval following MSEN, control logic 60 issues a flush control signal SHFLUSH to the sample and holds in sample and hold bank 58, discharging the contents of the sample and hold bank. External control signal CNTRL may now be asserted to the low state, thereby resetting control logic 60 so that the next train of alternating polarity signals of a second servo burst may be detected, compared and the median peak magnitude value selected and stored. Each stored median peak magnitude represents the median magnitude of the peak magnitude signals detected during a respective one of consecutive servo burst timing windows. Signal-storing circuit means, including sample and hold bank 58, comparators 70, 72, 74, 86, 88, register 90, median select logic 92 and select switch bank 66, receives the detected peak magnitude signals and selects and temporarily stores each consecutively determined median peak magnitude.

In the manner described above, individual peak magnitudes of sequential amplitude modulated servo burst signals are captured, sampled and held by the invention and the median value of a predetermined number of held peaks is determined. In the illustrated embodiment, capture, discrimination and median value determination of a preset number of peaks is carried out in response to a timing signal, provided by a timing circuit such as a servo timing and control processor, synchronized with servo sector phases to define a succession of timing windows such that each window occurs while a servo burst field is moving under an active read-write head.

Such a timing signal may be easily adapted by one ordinarily skilled in the art to be asserted at such times as a read/write head passes over a servo burst field, for instance an "A" burst, and be deasserted by completion of the control logic's sequential timing cycle, for instance the falling edge of SHFLUSH. The control signal may be again asserted when the read/write head passes over a next servo burst field, for instance a "B" burst. The process may be repeated for as many burst fields as are implemented in a particular servo format embodiment, with a median peak value selected for each servo burst. These median peak values may be then used in conventional fashion for comparison in, for example, an ADC circuit in order to determine whether the read/write head is displaced from a track centerline and if so by what degree and in what direction.

The invention described provides for determination of the median peak value of five sequentially captured peaks. Median peak detection may be as easily performed on any number of sequential peaks. A smaller number of peaks will allow minimization of the number of flux reversals required to be written in a servo burst, but non-random error sources such as media drop-out will exert a greater proportional effect. A media drop-out arbitrarily reducing peak values of two neighboring flux reversals would therefore mean the selection of one of the two error induced peak magnitudes as the median in a three peak system. A five peak system avoids this common problem by leaving three peaks unaffected by drop-out from which a median may be selected. Choice of a seven or larger number peak system will further reduce the probability of drop-out or fly-height modulation induced error, but at the cost of providing additional circuitry and increasing the size of the servo burst fields to accommodate additional peaks.

It should be recognized that the embodiment of the invention described is exemplary and that there are numerous ways in which the circuit elements described may be rearranged in order to provide the required functions. For instance, instead of a single peak detector, a bank of peak detectors may be provided in combination with the bank of sample and holds such that both positive and negative portions of the alternating polarity signal are directed through the switch bank. Control logic 60 is described as an array of flip-flops, but could as easily be implemented as a counter, shift register or some other suitable logical combination without violating the spirit of the invention. Similarly, the construction of the comparator array bank and median select logic 92 was selected for ease of explanation. A person ordinarily skilled in the art of circuit design may easily imagine alternative configurations of circuit elements that perform the same function, viz. comparing a particular peak value to all other peak values in a sample set, providing an intermediate signal representing a ranking order of the peak values of peaks in the sample set and further providing an output signal identifying the median peak value of the peaks in the sample set.

Although treated individually as a circuit, the median peak detector described above may be implemented as a single chip integrated circuit peak detector and demodulator which is connected to other external components such as an ADC/DAC. Alternatively, the median peak detector may be combined with other circuits, such as, but not limited to, an ADC/DAC circuit in a multi-function VLSI integrated circuit.

A significant improvement has been brought to the art of hard disk drive servo systems by description of a median peak detector wherein the median value of peak magnitude signals comprising a servo burst signal is determined, thereby reducing the effects of common non-random errors induced in servo head positioning burst signals.

We claim:

1. An integrated circuit having signal processing circuitry for a head positioning servo of the embedded type in which spaced-apart prerecorded servo bursts move under an active head to cause production of a servo read signal that, during each of a succession of timing windows marked by a timing signal, oscillates to define variable-magnitude peaks during servo-sector phases, the signal processing circuitry comprising:

detector circuit means having a signal-processing input for receiving the servo read signal, having a control input for receiving the timing signal, and having means for producing a detected signal that, during each timing window, successively represents the individual magnitudes of a plurality of the variable-magnitude peaks including one such magnitude so represented that has the median magnitude; and signal-storing circuit means having a signal-processing input for receiving the detected signal, and having means responsive to the detected signal for producing and temporarily storing a first and then a second stored signal such that each stored signal represents the median magnitude represented by the detected signal during a respective one of consecutive timing windows.

2. An integrated circuit in accord with claim 1, wherein the signal-storing circuit means includes:

sample and hold circuit means which defines the input for receiving the detected signal, and which produces a set of held signals that are used in the production of the first and second stored signals.

3. An integrated circuit in accord with claim 2, wherein the sample and hold circuit means includes:

circuit means having multiple outputs, and circuit means responsive to the detected signal for producing and temporarily maintaining at the multiple outputs a set of held signals that each correspond to a respective one of the magnitudes represented the detected signal.

4. An integrated circuit in accord with claim 3, wherein the signal-storing circuit means further includes:

encoder circuit means, decoder circuit means, and selection circuit means organized to cooperate to produce the first and second stored signals.

5. An integrated circuit having signal processing circuitry for a head positioning servo of the embedded type in which spaced-apart prerecorded servo bursts move under an active head to cause production of a servo read signal that oscillates to define variable-magnitude peaks during servo-sector phases, the signal processing circuitry comprising:

timing circuit means for providing a timing signal synchronized with the servo-sector phases to define a succession of windows such that each window occurs while a servo burst is moving under the active head;

detector circuit means having a signal-processing input for receiving the servo read signal, having a control input for receiving the timing signal, and having means for producing a detected signal that, during each timing window, successively represents the individual magnitudes of a plurality of the variable-magnitude peaks including one such magnitude so represented that has the median magnitude;

sample and hold circuit means having a signal-processing input for receiving the detected signal, having multiple outputs, and having means responsive to the detected signal for producing and temporarily maintaining at the multiple outputs a set of held signals that each correspond to a respective one of the magnitudes represented the detected signal;

encoder circuit means for converting the held signals into an encoded signal;

decoder circuit means for decoding the encoded signal to produce a select signal; and selection circuit means responsive to the select signal for producing a signal that, during consecutive timing windows, represents the median magnitude represented by the detected signal during a respective one of such consecutive timing windows.

6. Signal processing circuitry for a head positioning servo of the embedded type in which spaced-apart prerecorded servo bursts move under an active head to cause production of a servo read signal that oscillates to define variable-magnitude peaks during servo-sector phases, the signal processing circuitry comprising:

timing circuit means for providing a timing signal synchronized with the servo-sector phases to define a succession of windows such that each window occurs while a servo burst is moving under the active head;

detector circuit means having a signal-processing input for receiving the servo read signal, having a control input for receiving the timing signal, and having means for producing a detected signal that, during each timing window, successively represents the individual magnitudes of a plurality of the variable-magnitude peaks including one such magnitude so represented that has the median magnitude;

signal-storing circuit means having a signal-processing input for receiving the detected signal, and having means responsive to the detected signal for producing and temporarily storing a first and then a second stored signal such that each stored signal represents the median magnitude represented by the detected signal during a respective one of consecutive timing windows; and circuit means responsive to the first and second stored signals for producing a servo error signal for use in correcting any error in head position relative to a desired track centerline.

7. A disk drive having a head positioning servo of the embedded type, the disk drive comprising:

at least one disk having, on a major surface thereof, embedded servo sectors including spaced-apart prerecorded servo bursts;

at least one head;

means for supporting the head adjacent the major surface;

electrically-controllable actuator means for moving the head;

the head having an output such that, while servo bursts move under the head, the head produces a servo read signal that oscillates to define variable-magnitude peaks during servo-sector phases;

timing circuit means for providing a timing signal synchronized with the servo-sector phases to define a succession of windows such that each window occurs while a servo burst is moving under the head;

detector circuit means having a signal-processing input for receiving the servo read signal, having a control input for receiving the timing signal, and having means for producing a detected signal that, during each timing window, successively represents the individual magnitudes of a plurality of the variable-magnitude peaks including one such magnitude so represented that has the median magnitude;

signal-storing circuit means having a signal-processing input for receiving the detected signal, and having means responsive to the detected signal for producing and temporarily storing a first and then a second stored signal such that each stored signal represents the median magnitude represented by the detected signal during a respective one of consecutive timing windows;

circuit means responsive to the first and second stored signals for producing a servo error signal for use in correcting any error in head position relative to a desired track centerline; and means responsive to the servo error signal for electrically controlling the actuator means to move the head.

8. An integrated circuit for amplitude demodulation of servo read signals produced by a head positioning servo of the embedded type in which spaced-apart prerecorded servo bursts move under an active head to cause an oscillating signal defining variable-magnitude peaks during servo-sector phases, the integrated circuit comprising;

detector circuit means including;

means for defining a succession of timing intervals;

peak detector circuit means having an output and a signal-processing input for receiving the servo read signal, the peak detector circuit means successively defining individual peaks of the servo burst signal within a respective timing interval; and, sample and hold circuit means for sampling and holding the defined peaks to produce a corresponding set of held peak magnitude signals, each representing a respective one of the successively defined peaks of the servo burst signal;

encoder circuit means for converting the held peak magnitude signals into digital signals representing relative magnitude values of the held magnitude signals;

decoder circuit means for decoding the magnitude values of said digital signals, decoder circuit means providing at an output thereof a select signal defining a particular one of the held magnitude signals as having a median magnitude value; and, selection circuit means responsive to the select signal for selecting said median magnitude signal from the held magnitude signals held in the sample and hold circuit means and temporarily storing said median magnitude signal at an output thereof.

9. The integrated circuit of claim 8, wherein the means for defining a timing interval comprises a zero crossing detector connected to receive the servo burst signal and in response thereto generate a timing signal having a periodicity with an integer relationship to the periodicity of individual peaks comprising the servo burst signal.

10. The integrated circuit of claim 9, the detector circuit means further including;

timing circuit means for providing a timing signal synchronized with the servo sector phases to define a succession of timing windows such that each window occurs while a servo burst is moving under an active head;

control logic means responsive to the timing signal for generating a plurality of sequential control signals, each control signal having a periodicity equal to the periodicity of a timing interval; and, sequencing means for receiving an output signal from the peak detector circuit means at an input thereof and for sequentially directing the peak detector output signal to a respective one of a plurality of outputs thereof in response to the sequential control signals.

11. The integrated circuit of claim 10, wherein sample and hold circuit means comprises a plurality of sample and hold circuits each connected to a respective one of the plurality of outputs of the sequencing means, the output signal of the peak detector circuit means provided to each respective sample and hold circuit in sequence by the sequencing means.

12. An integrated circuit for amplitude demodulation of servo read signals produced by a head positioning servo of the embedded type in which spaced-apart prerecorded servo bursts move under an active head to cause an oscillating signal defining variable-magnitude, positive and negative going peaks, the integrated circuit comprising;

means for successively defining a timing interval;

peak detector circuit means for successively defining positive going peaks of the servo error signal within a respective timing interval;

a plurality of sample and hold circuits each connected to receive respective ones of the successively defined positive going peaks from the peak detector circuit means for sampling and holding the defined positive peaks to produce a corresponding plurality of held magnitude signals, each representing the peak magnitude of a corresponding positive peak;

encoder circuit means for converting the held magnitude signals into digital signals, the digital signals representing a ranking order of magnitude values of the held magnitude signals;

decoder circuit means for decoding the ranking order of the magnitude values of said digital signals, decoder circuit means determining a median magnitude value of said ranking order and providing at an output thereof a select signal defining a particular one of the held magnitude signals as having said median magnitude value; and, selection circuit means connected to the sample and hold circuits and responsive to the select signal for selecting a corresponding one of the sample and hold circuits whose held magnitude signal is defined as having said median magnitude value and temporarily storing said median magnitude at an output thereof.

13. The integrated circuit of claim 12, the encoder circuit means further comprising;

a plurality of comparators connected to the sample and hold circuits for comparing the magnitude values of the plurality of held magnitude signals, the comparators disposed in an array such that each held magnitude signal is compared in magnitude to each respective other held magnitude signal, and where the array produces a digital signal representing a ranking order of the magnitude values of the held magnitude signals; and, a register connected to the array of sample and hold circuits for intermediate storage of the digital signals.

14. The integrated circuit of claim 13, decoder circuit means further comprising a plurality of outputs equal in number to the plurality of sample and hold circuits, each output corresponding to a respective one of said sample and holds, said select signal being provided on a respective one of the plurality of outputs corresponding to the sample and hold circuits whose held magnitude signal is defined as having said median magnitude value.

15. The integrated circuit of claim 14, selection circuit means further comprising a plurality of switches each connected to a respective one of the plurality of sample and holds and each connected to a respective one of the plurality of detector circuit outputs, each switch operatively responsive to said select signal being provided on its respective decoder circuit output thereby providing an electrical connection between the corresponding sample and hold and the output of the selection circuit means.

\* \* \* \* \*